INVENTOR
HUGH A. RACE

INVENTOR
HUGH A. RACE

INVENTOR
HUGH A. RACE

United States Patent Office

Re. 26,503
Reissued Dec. 10, 1968

26,503

VOLUME ADJUSTING APPARATUS FOR COMPRESSOR CYLINDER CLEARANCE POCKETS

Hugh A. Race, Big Flats, N.Y., assignor to Ingersoll-Rand Company, New York, N.Y., a corporation of New Jersey Original No. 3,354,790, dated Nov. 28, 1967, Ser. No. 508,944, Nov. 22, 1965. Application for reissue Feb. 20, 1968, Ser. No. 709,152
10 Claims. (Cl. 92—59)

Matter enclosed in heavy brackets [ ] appears in the original patent but forms no part of this reissue specification; matter printed in italics indicates the additions made by reissue.

ABSTRACT OF THE DISCLOSURE

An apparatus for adjusting the effective volume of a compressor cylinder clearance pocket, including a closure member and spacer members for retaining the closure member in a plurality of alternative positions in the clearance pocket.

This invention relates to compressors and more particularly to piston-type compressors having cylinder clearance pockets for controlling the capacities of the compressor cylinders.

Conventionally, the cylinders of piston-type compressors are usually individually designed of specific capacities which are dictated by the requirements of their respective compressors. Consequently, each compressor cylinder, or group of compressor cylinders, for a particular piston-type compressor is usually of different capacity than that for another piston-type compressor. When a clearance pocket is provided for a compressor cylinder, this difference in the required cylinder capacity normally necessitates a variation in the volume of the clearance pocket communicating with the compressor cylinder. Heretofore, this variation in cylinder clearance pocket volume has generally been obtained by the alteration of the basic cylinder casting to form the cylinder clearance pocket of the required volume. This method of varying the clearance pocket volume, however, requires costly pattern changes and is extremely uneconomical in application.

An object of the present invention is to provide a new and improved apparatus for adjusting the effective volume of a cylinder clearance pocket as necessary to provide the required cylinder clearance pocket volume without requiring an alteration of the cylinder casting.

Another object of the invention is to provide a new and improved apparatus of the type set forth which is relatively simple and economical in construction and highly efficient and dependable in operation.

The foregoing objects, and the other objects and advantages of the invention which will be apparent from the following description taken in connection with the accompanying drawings, are obtained by the provision, in combination with a compressor cylinder and a clearance pocket communicating with the cylinder, of an apparatus for varying the volume of the clearance pocket communicating with the cylinder. This apparatus comprises a closure means disposed within the clearance pocket for closing a portion of the volume of the clearance pocket from communication with the cylinder, and a means for adjusting the disposition of the closure means in the clearance pocket to vary the portion of the volume of the clearance pocket closed by the closure means from communication with the cylinder.

Referring to the drawings wherein two embodiments of the invention have been given for the purposes of illustration:

Figure 1:
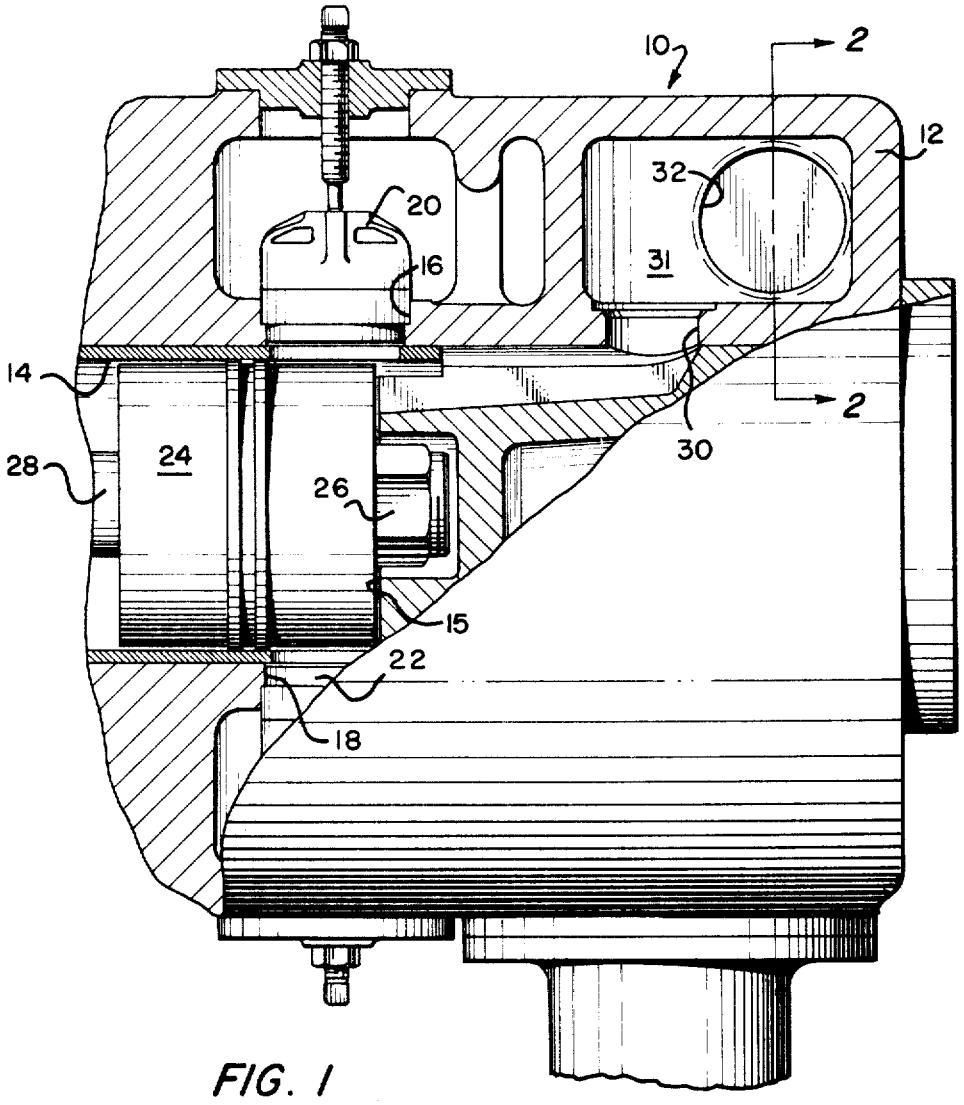
FIG. 1 is a fragmentary sectional view of a portion of a piston-type compressor illustrating a compressor cylinder in combination with a clearance pocket containing an embodiment of the present invention.

Referring more particularly to the drawings wherein similar reference characters designate corresponding parts throughout the several views, FIG. 1 illustrates a fragmentary view of a piston-type compressor designated generally at 10 which includes a housing 12 having a bore 14 forming one of the cylinders of the compressor 10. The cylinder bore 14 communicates adjacent its head end 15 with an inlet fluid passage 16 which is adapted to supply fluid to be compressed to the cylinder bore 14, and a discharge fluid passage 18 which is adapted to convey compressed fluid from the cylinder bore 14. A valve 20 is disposed within the inlet fluid passage 16 to control the flow of the fluid to be compressed into the cylinder bore 14. A valve 22 is disposed within the discharge fluid passage 18 to control the flow of the compressed fluid from the cylinder bore 14.

A piston 24 is slidably disposed within the cylinder bore 14 for compressing the fluid introduced into the cylinder bore 14 by the fluid inlet passage 16. The piston 24 is secured by a mounting nut 26 to one end of a piston rod 28 which is suitably connected at its opposing end to a driving means such as a crankshaft (not shown) to transmit reciprocatory movement to the piston 24.

The cylinder bore 14 communicates at its head end 15 with a fluid passage 30 which, in turn, communicates with a housing cavity 31. The housing cavity 31 communicates with one longitudinal end of a constant diameter, cylindrical clearance pocket 32. The clearance pocket 32 receives fluid displaced by the piston 24 during its movement towards the head end 15 of the cylinder bore 14 to control the compression of the fluid within the cylinder bore 14 during such movement of the piston 24.

Figure 2:
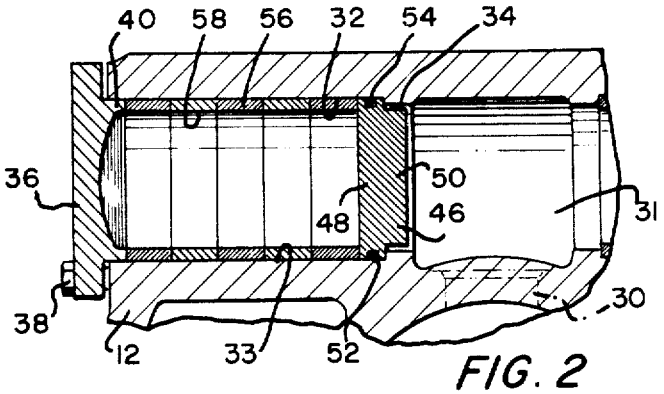
FIG. 2 is an enlarged sectional side view of the clearance pocket shown in FIG. 1, taken on line 2—2 of FIG. 1, with the embodiment of the invention disposed to permit communication of a minimum portion of the volume of the clearance pocket with the compressor cylinder.
Figure 3:
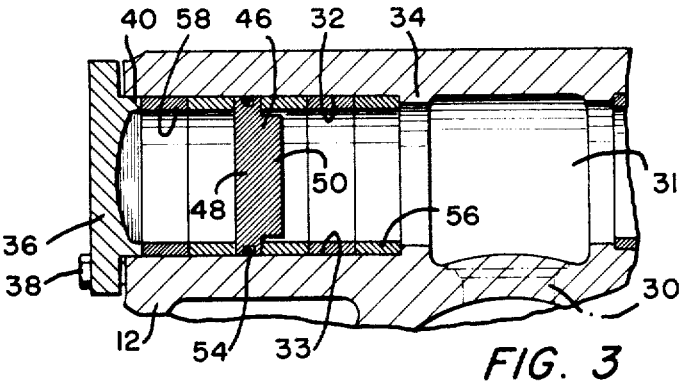
FIG. 3 is an enlarged sectional side view generally similar to FIG. 2, but showing the embodiment of the invention disposed to permit an increased portion of the volume of the clearance pocket to communicate with the compressor cylinder.

As illustrated in FIGS. 2 and 3, the clearance pocket 32 is provided with a radially extending, annular shoulder 34 adjacent its end communicating with the fluid passage 30. The clearance pocket 32 is closed at its opposing end by a cover plate 36 which is detachably secured to the housing 12 by a plurality of bolts or similar fastening means 38. The cover plate 36 includes an annular shoulder 40 which projects longitudinally into the clearance pocket 32 and engages the walls 33 of the clearance pocket 32.

Figure 4:
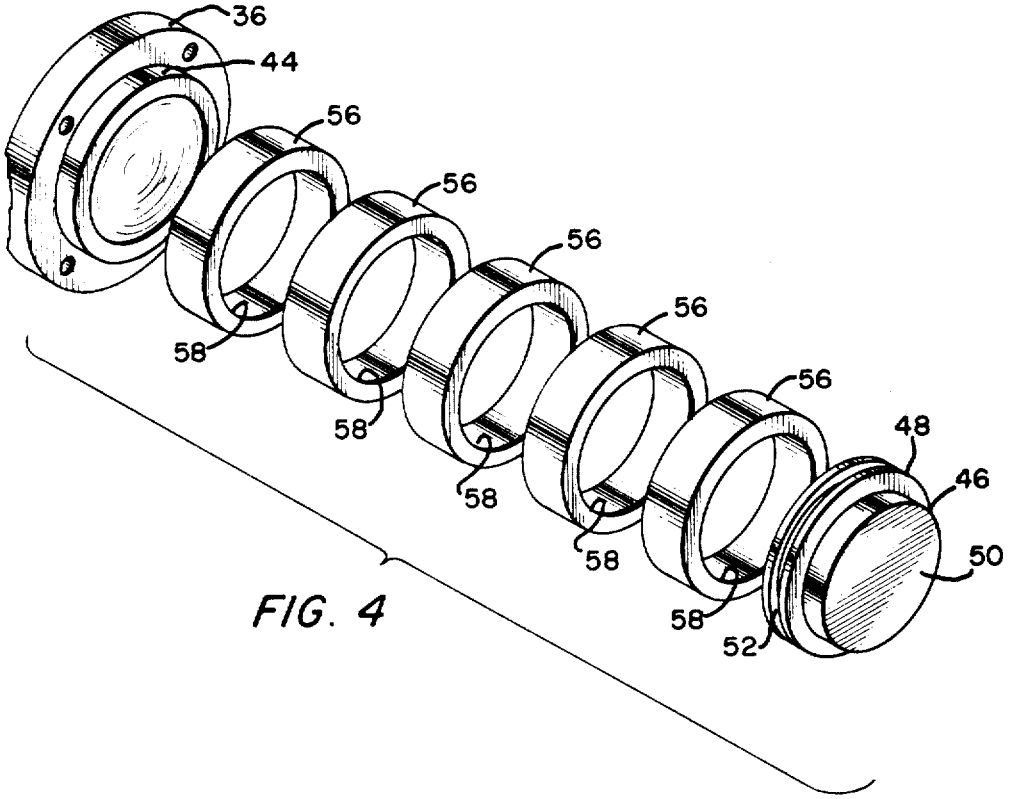
FIG. 4 is an exploded view of the embodiment of the invention illustrated in FIGS. 1 through 3.

A closure or plug member 46 is disposed transversely within the clearance pocket 32 for closing off a portion of the volume of the clearance pocket 32 from communication with the cylinder bore 14. The closure member 46 is formed to include a solid, circular head portion 48 which has a diameter substantially equal to the constant diameter of the clearance pocket 32 and, thus, engages the walls 33 of the clearance pocket 32 along its circumference. The head portion 48 of the closure member 46 is provided with a circumferential, annular groove 52 containing an annular sealing member or ring 54 which prevents fluid leakage between the head potrion 48 and the walls 33 of the clearance pocket 32. The head portion 48 carries a reduced diameter, circular nose portion 50 of the closure member 46 which, as illustrated in FIGS. 2 through 4, extends longitudinally from the head portion 48 towards the housing cavity 31. Alternatively, however, the disposition of the closure member 46 could be reversed to cause the nose portion 50 to extend longitudinally from the head portion 48 towards the cover plate 36.

The closure member 46 is retained transversely in the clearance pocket 32 by a plurality of annular spacer members or rings 56. The spacer rings 56 are each formed with a diameter substantially equal to the constant diameter of the clearance pocket 32 and include axially disposed, aligned openings 58. The spacer rings 56 are disposed transversely in the clearance pocket 32 with their circumferences in engagement with the walls 33 thereof and retain the closure member 46 transversely in the clearance pocket 32 by wedging the head portion 48 between the annular shoulder 34 of the clearance pocket 32 and the annular shoulder 40 of the cover plate 36. The openings 58 in the spacer rings 56 permit the latter to receive the nose portion 50 of the closure member 46 during their retention of the closure member 46 and prevent the spacer rings 56 from substantially reducing the flow volume of the clearance pocket 32. *Moreover, the openings 58 are cooperable, when the closure member 46 is disposed at the extreme left-hand end of the clearance pocket 32, to form a spacer ring cavity which communicates with the cylinder bore 14. It is this spacer ring cavity, or more specifically any portion thereof not closed off by the closure member 46, which provides the variable volume clearance for the compressor cylinder; and, hence, the clearance provided the cylinder is determined by the portion of the volume of the spacer ring cavity closed off from the cylinder bore 14 by the closure member 46.* As illustrated in FIGS. 2 and 3, the spacer rings 56 are constructed of substantially equal cross-sectional width and are all of identical construction.

From the foregoing it will be seen that the spacer rings 56 are each interchangeable in position in the clearance pocket 32 with the head portion 48 of the closure member 46. Thus, the portion of the volume of the clearance pocket 32 closed off from communication with the cylinder bore 14 may readily and easily be varied as required by merely interchanging the position of the head portion 48 of the closure member 46 with that of one of the sealing rings 56. Furthermore, it will be seen that, by removing the closure member 46 and the sealing rings 56 from the clearance pocket 32, the entire volume of the clearance pocket 32 may be permitted to communicate with the cylinder bore 14. In this latter instance, however, a sealing ring (not shown) should normally be located circumferentially around the annular shoulder 40 of the cover plate 36 to prevent leakage between the annular shoulder 40 and the walls 33 of the clearance pocket 32.

By way of more specific example, with the closure member 46 located as illustrated in FIG. 2, substantially all of the volume of the clearance pocket 32 is closed off from the cylinder bore 14. If, however, it is necessary to increase the portion of the volume thereof communicating with the cylinder bore 14, the head portion 48 of the closure member 46 and the spacer rings 56 need only be interchanged in position, as shown in FIG. 3, to decrease the portion of the clearance pocket 32 closed by the closure member 46 from the cylinder bore 14. *Thence a portion of the volume of the spacer ring cavity is placed in communication with the cylinder bore 14 to provide increased clearance for the cylinder.* In like manner, the portion of the volume of the *spacer ring cavity, and hence of the* clearance pocket 32, communicating with the cylinder bore 14 may be varied as required without the necessity for altering the cylinder casting.

Figure 5:
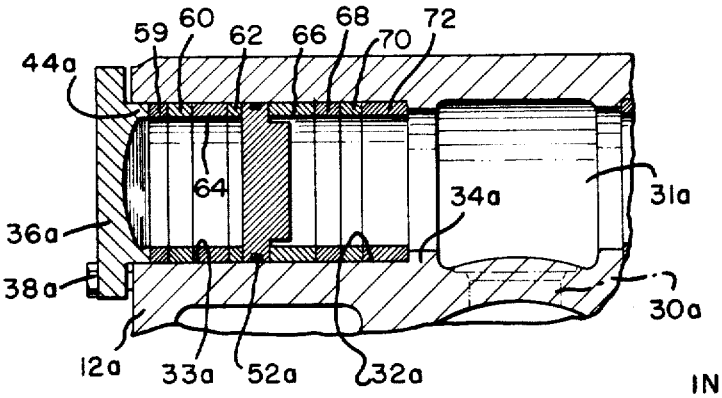
FIG. 5 is an enlarged sectional side view generally similar to that of FIG. 3 but illustrating a clearance pocket containing an alternative embodiment of the invention.

FIG. 5 illustrates a modified embodiment of the present invention wherein all parts similar to those previously described are designated by the reference character for their similar part followed by the suffix a. In this embodiment of the invention, the spacer rings 59, 60, 62, 64, 66, 68, 70 and 72 are particularly constructed to permit extremely accurate location of the closure member 46a within the clearance pocket 32a. More specifically, as will be seen from FIG. 5, each one of the spacer rings 59, 60, 62, 64, 66, 68, 70 and 72 is constructed of a different cross-sectional width. Thus, the positions of the spacer rings 59, 60, 62, 64, 66, 68, 70 and 72 and the closure member 46a may be interchanged to provide almost finite disposition of the closure member 46a in the clearance pocket 32a.

From the foregoing it will be seen that I have provided a new and improved apparatus for varying the portion of the volume of a clearance pocket communicating with a cylinder to vary the capacity of the cylinder without altering the casting forming the cylinder. It will also be seen that, although my invention is relatively simple and economical in construction, it provides a highly efficient and dependable adjustment of the portion of the volume of the clearance pocket communicating with the cylinder.

It will be understood, however, that, although a preferred and an alternative embodiment of the invention have been illustrated and described in detail, the invention is not limited simply to these embodiments but contemplates other embodiments and variation which utilize the concepts and teachings of this invention.

Having thus described my invention, I claim:

1. In combination with a compressor cylinder and a clearance pocket communicating with said cylinder, an apparatus for varying the volume of said clearance pocket communicating with said cylinder, comprising:

a closure member disposed within said clearance pocket for closing a portion of the volume of said clearance pocket from communication with said cylinder; and a plurality of separable spacer rings disposed within said clearance pocket and relocatable therein to adjust the disposition of said closure member in said clearance pocket to vary the portion of the volume of said clearance pocket closed by said closure member from communication with said cylinder.

2. An apparatus according to claim 1, wherein said spacer rings are interchangeable in position with said closure member to adjust the location of said closure member in said clearance pocket.

3. An apparatus according to claim 2, wherein said spacer rings are constructed of varying dimensions to facilitate the relocation of said closure member within said clearance pocket.

4. In combination with a compressor cylinder and a clearance pocket communicating with said cylinder, an apparatus for varying the volume of said clearance pocket communicating with said cylinder, comprising:

a closure member extending transversely in said clearance pocket for closing a portion of the volume of said clearance pocket from communication with said cylinder; and a plurality of separable annular spacer members extending transversely in said clearance pocket to retain said closure member in position therein and interchangeable in position with said closure member to adjust the position of said closure member in said clearance pocket to vary the portion of the volume of said clearance pocket closed by said closure member from communication with said cylinder.

5. An apparatus according to claim 4, wherein said spacer members are formed of different widths to facilitate the relocation of said closure member at substantially any position in said clearance pocket.

6. An apparatus according to claim 4, wherein a means is provided for retaining said closure member and said annular spacer members transversely in said clearance pocket.

7. An apparatus according to claim 6, wherein said retaining means comprises a retaining member disposed within said clearance pocket adjacent each of the opposing ends thereof.

*8. In combination, a compressor cylinder; a plurality of separable hollow spacer elements peripherally defining openings which are cooperable to form a cavity in communication with said cylinder; a closure member for closing a portion of the volume of said cavity from communication with said cylinder; said spacer elements and said closure member being interchangeable in position to vary the portion of the volume of said cavity closed by said closure member from communication with said cylinder; and means for retaining said spacer elements and said closure member in interchanged positions.*

*9. The combination of claim 8, further comprising said closure member extending transversely to said cavity and including a portion insertable into the opening peripherally defined by at least one of said spacer elements.*

*10. In combination with a compressor cylinder and a clearance pocket communicating with said cylinder, an apparatus for varying the volume of the clearance pocket communicating with said cylinder, comprising:*

*a closure member disposed within said clearance pocket for closing a portion of the volume of the clearance pocket from communication with said cylinder;*

*a plurality of separable spacer rings interchangeable in position with said closure member for adjusting the disposition of said closure member to vary the portion of the volume of the clearance pocket closed by said closure member from communication with said cylinder; and means for retaining said spacer rings and said closure member in interchanged positions.*

References Cited

The following references, cited by the Examiner, are of record in the patented file of this patent or the original patent.

UNITED STATES PATENTS

| | | | |
|---|---|---|---|
| 1,394,835 | 10/1921 | Hunt | 230—21 |
| 2,047,167 | 7/1936 | Heller | 230—21 |
| 2,729,388 | 1/1956 | Ringham | 92—59 X |
| 3,106,313 | 10/1963 | Kurhan | 220—9 |
| 3,198,421 | 8/1965 | Alyea et al. | 230—21 |

MARTIN P. SCHWADRON, *Primary Examiner.*

I. C. COHEN, *Assistant Examiner.*

U.S. Cl. X.R.

123—48; 230—21